(12) United States Patent
Wen et al.

(10) Patent No.: US 11,262,794 B2
(45) Date of Patent: Mar. 1, 2022

(54) ELECTRONIC APPARATUS

(71) Applicant: Acer Incorporated, New Taipei (TW)

(72) Inventors: Chun-Hung Wen, New Taipei (TW);
Chun-Hsien Chen, New Taipei (TW);
Hui-Ping Sun, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/156,638

(22) Filed: Jan. 25, 2021

(65) Prior Publication Data

US 2021/0365069 A1 Nov. 25, 2021

(30) Foreign Application Priority Data

May 22, 2020 (TW) .................................. 109206309

(51) Int. Cl.
*G06F 1/16* (2006.01)
*G06F 3/02* (2006.01)
*H04R 1/02* (2006.01)
*G06F 3/0354* (2013.01)

(52) U.S. Cl.
CPC ............ *G06F 1/1624* (2013.01); *G06F 1/166* (2013.01); *G06F 1/1616* (2013.01); *G06F 1/1647* (2013.01); *G06F 1/1662* (2013.01); *G06F 1/1667* (2013.01); *G06F 1/1669* (2013.01); *G06F 3/0202* (2013.01); *G06F 3/03545* (2013.01); *H04R 1/025* (2013.01); *H04R 2499/15* (2013.01)

(58) Field of Classification Search
CPC .... G06F 1/1601; G06F 1/1624; G06F 1/1637; G06F 1/1647; G06F 1/1662; G06F 1/1669; G06F 1/166; G06F 1/16; G06F 1/1616; G06F 1/1667; G06F 1/1684; G06F 1/1671; G06F 1/1681; G06F 1/1641; G06F 3/0412
See application file for complete search history.

(56) References Cited

U.S. PATENT DOCUMENTS

| | | | | |
|---|---|---|---|---|
| 5,818,360 A | * | 10/1998 | Chu | G06F 1/1616 341/22 |
| 6,816,365 B2 | * | 11/2004 | Hill | G06F 1/1616 341/22 |
| 7,894,184 B2 | * | 2/2011 | Huang | G06F 1/1616 361/679.48 |
| 9,104,374 B2 | * | 8/2015 | Tsai | G06F 1/1633 |
| 9,110,634 B2 | * | 8/2015 | Huang | G06F 1/1667 |
| 10,254,803 B1 | * | 4/2019 | Quinn | G06F 1/1643 |

(Continued)

*Primary Examiner* — Dismery Mercedes
(74) *Attorney, Agent, or Firm* — JCIPRNET

(57) ABSTRACT

An electronic apparatus includes a host, a main display, a keyboard, an auxiliary display, and a supporting mechanism. The main display is pivotally connected to the host. The keyboard is slidably disposed on the host. The auxiliary display is disposed on the host and is arranged side by side with the keyboard. The auxiliary display includes a movable end and a lifting end, the keyboard contacts the movable end, and the movable end is slidably connected to the host. The supporting mechanism includes a first link, a second link, and a third link. The first link is slidably connected to the host and is pivotally connected to the second link. The second link is pivotally connected to the host and is pivotally connected to the third link. The third link is pivotally connected to the lifting end.

8 Claims, 3 Drawing Sheets

(56) References Cited

U.S. PATENT DOCUMENTS

| | | | |
|---|---|---|---|
| 11,079,802 B1* | 8/2021 | Morino | G06F 1/165 |
| 2005/0138775 A1* | 6/2005 | Oakley | G06F 1/1616 |
| | | | 16/368 |
| 2011/0188187 A1* | 8/2011 | Barnett | G06F 1/1666 |
| | | | 361/679.01 |
| 2012/0217855 A1* | 8/2012 | Chen | G06F 1/1616 |
| | | | 312/323 |
| 2013/0069878 A1* | 3/2013 | Li | G06F 1/1616 |
| | | | 345/168 |
| 2019/0250674 A1* | 8/2019 | Lin | F16M 13/005 |
| 2020/0241603 A1* | 7/2020 | Lin | G06F 1/1656 |
| 2020/0363839 A1* | 11/2020 | Liu | G06F 1/1616 |

\* cited by examiner

ELECTRONIC APPARATUS

CROSS-REFERENCE TO RELATED APPLICATION

This application claims the priority benefit of Taiwan application serial no. 109206309, filed on May 22, 2020. The entirety of the above-mentioned patent application is hereby incorporated by reference herein and made a part of this specification.

BACKGROUND

Technical Field

The disclosure relates to an electronic apparatus, and more particularly, relates to an electronic apparatus including a main display and an auxiliary display.

Description of Related Art

Nowadays, notebook computers have become an indispensable tool for people owing to several features including multitasking, high computing efficiency, and portability. Generally, a notebook computer includes a host and a display. The display is pivotally connected to the host, and the host is integrated with a keyboard.

At present, in order to meet users' needs for flexible operation, notebook computers including auxiliary displays integrated on the hosts are available. To be specific, an auxiliary display and a keyboard are on the work plane, and the auxiliary display and the keyboard are arranged side by side. Nevertheless, in most of the auxiliary displays, the angles and heights are not adjustable, so that the users may not enjoy a convenient operating experience and their eyes may easily feel tired. Although auxiliary displays providing adjustable angles and heights are available, the lifted auxiliary displays are not stably supported. As such, when a user works on an auxiliary display of this type, the auxiliary display may easily swing or sink. In addition, in most cases, lifting up of an auxiliary display and opening up of a main display are synchronously performed. That is, when the main display is opened up relative to the host, the auxiliary display is synchronously lifted up, poor operational flexibility is thus provided.

SUMMARY

The disclosure provides an electronic apparatus exhibiting not only good operational convenience and flexibility but also favorable operational reliability.

The disclosure provides an electronic apparatus includes a host, a main display, a keyboard, an auxiliary display, and a supporting mechanism. The main display is pivotally connected to the host. The keyboard is slidably disposed on the host. The auxiliary display is disposed on the host and is arranged side by side with the keyboard. The auxiliary display includes a movable end and a lifting end, the keyboard contacts the movable end, and the movable end is slidably connected to the host. The supporting mechanism includes a first link, a second link, and a third link. The first link is slidably connected to the host and is pivotally connected to the second link. The second link is pivotally connected to the host and is pivotally connected to the third link. The third link is pivotally connected to the lifting end.

To sum up, in the electronic apparatus integrated with the auxiliary display provided by the disclosure, since the angle and height of the auxiliary display may be adjusted, the user may conveniently operate on the auxiliary display and may enjoy a comfortable viewing experience when using the auxiliary display. In addition, the user may push the auxiliary display by pushing the keyboard and drives the auxiliary display to slide and be lifted up relative to the host. That is, the angle and height of the auxiliary display may be adjusted by the user according to personal needs, such that the electronic apparatus provided by the disclosure exhibits good operational flexibility. When the auxiliary display is being lifted relative to the host, the supporting mechanism synchronously moves, and the auxiliary display is supported by the supporting mechanism. That is, the lifted auxiliary display is securely supported by the supporting mechanism and may not easily swing or sink. The electronic apparatus provided by the disclosure therefore exhibits good operational reliability.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
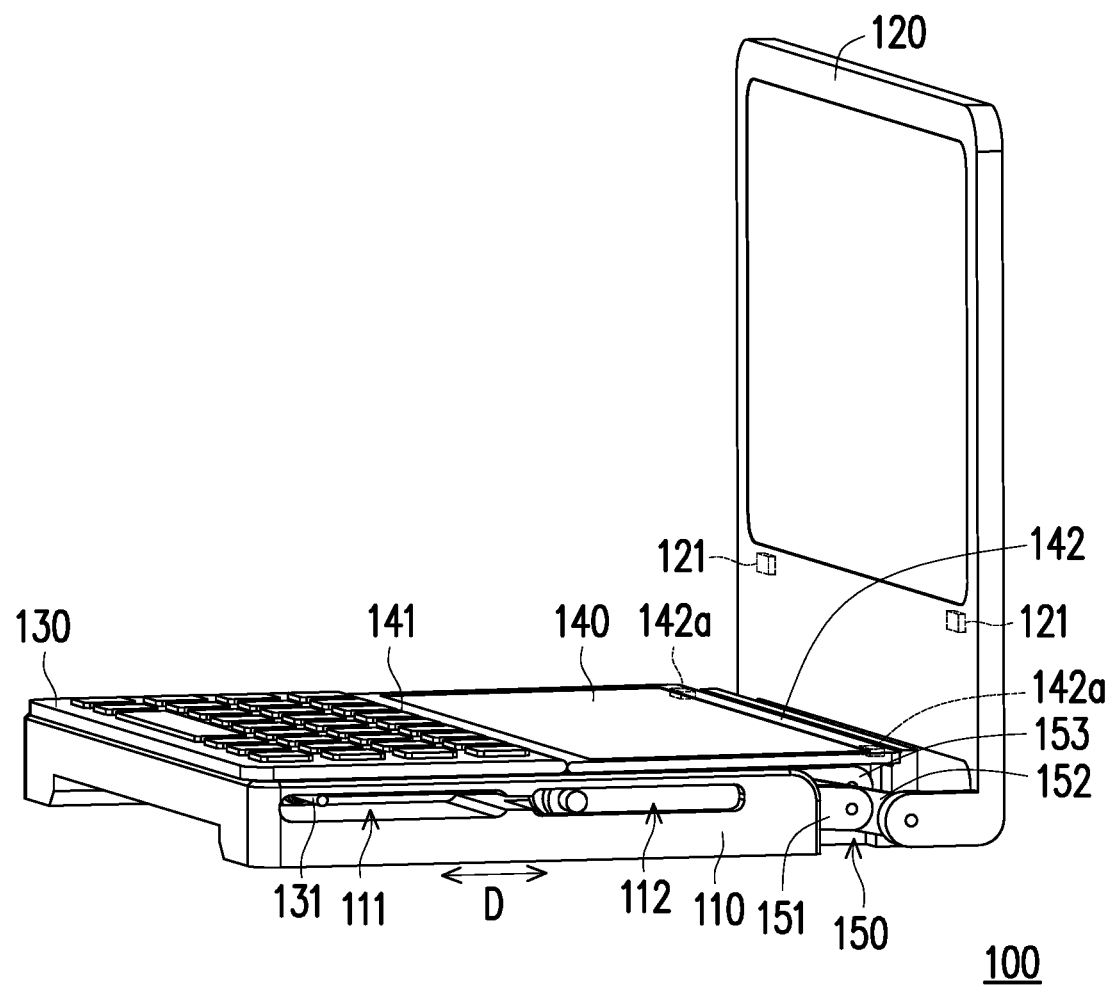
FIG. 1 is a schematic view of an electronic apparatus in a first state according to an embodiment of the disclosure.
Figure 2:
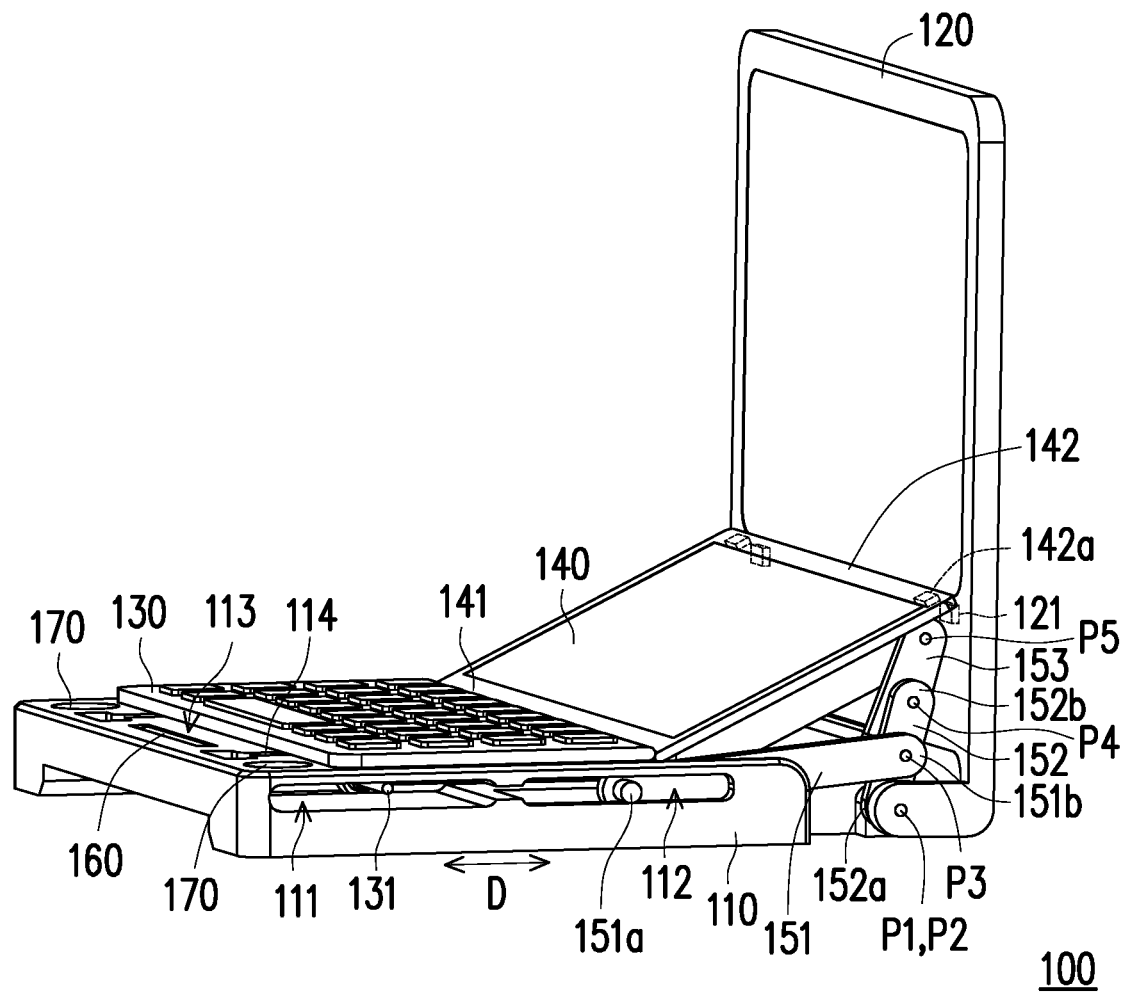
FIG. 2 is a schematic view of the electronic apparatus in a second state according to an embodiment of the disclosure.
Figure 3:
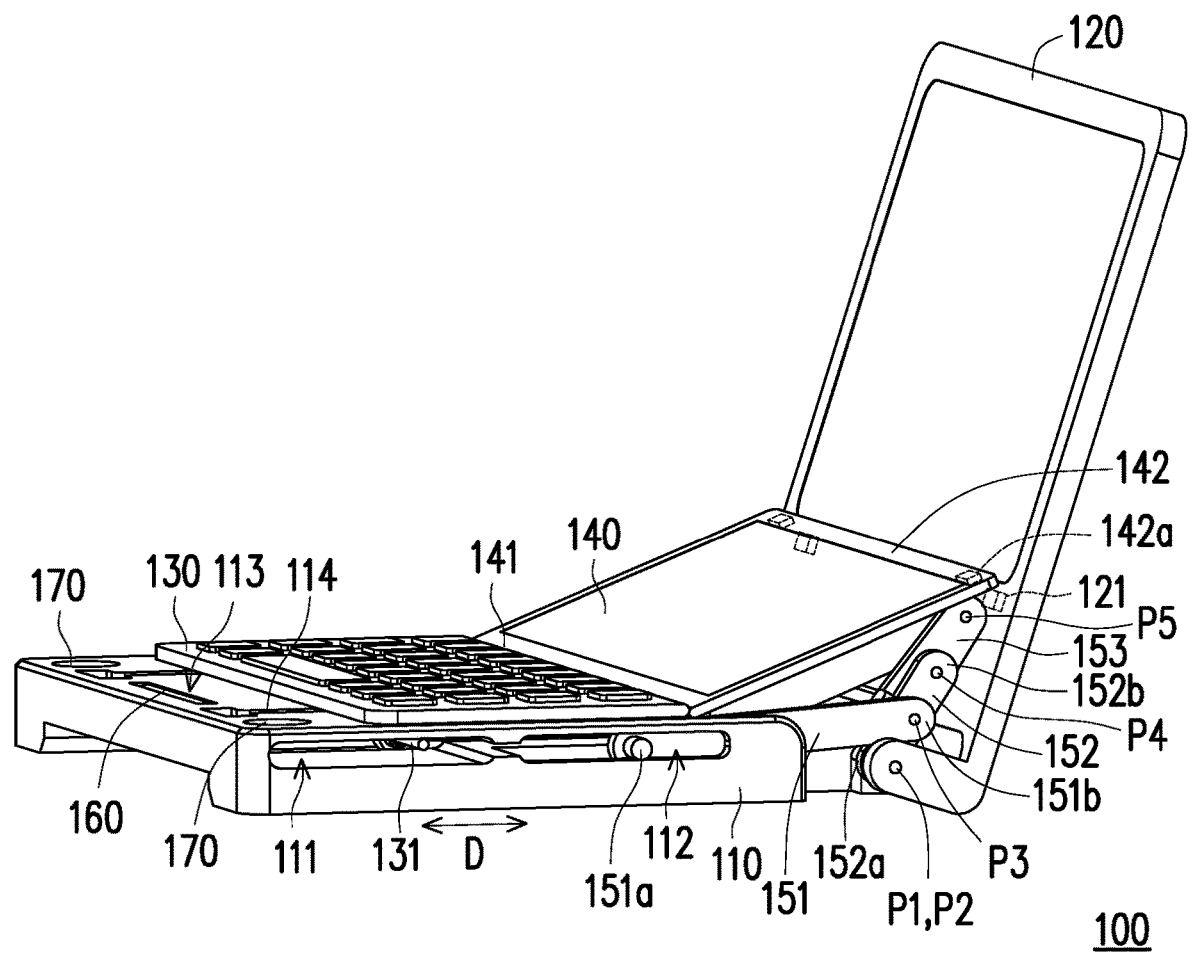
FIG. 3 is a schematic view of the electronic apparatus in a third state according to an embodiment of the disclosure.

FIG. 1 is a schematic view of an electronic apparatus in a first state according to an embodiment of the disclosure. FIG. 2 is a schematic view of the electronic apparatus in a second state according to an embodiment of the disclosure. FIG. 3 is a schematic view of the electronic apparatus in a third state according to an embodiment of the disclosure. With reference to FIG. 1, in this embodiment, an electronic apparatus 100 may be a notebook computer and includes a host 110, a main display 120, a keyboard 130, an auxiliary display 140, and a supporting mechanism 150. The host 110 is configured to perform functions such as logic operation, signal control, and data access, and the main display 120, the keyboard 130, and the auxiliary display 140 are electrically coupled to the host 110.

The main display 120 is configured to display a home screen and is pivotally connected to the host 110, so as to be switched between an opened state and a closed state, and an opening angle of the main display 120 relative to the host 110 is adjustable. As shown in FIG. 1 to FIG. 3, the auxiliary display 140 is slidable and is disposed on the host 110 to be moved up and down. The auxiliary display 140 herein is configured to display an auxiliary screen and provides a touch control function, so that the electronic apparatus 100 may be conveniently and flexibly operated. In addition, the keyboard 130 acts as a physical input interface to assist a user in inputting a signal into the host 110. The keyboard 130 and the auxiliary display 140 are arranged side by side and are disposed on the host 110, and the keyboard 130 and the auxiliary display 140 may synchronously slide in a sliding direction D.

As shown in FIG. 1 to FIG. 3, the auxiliary display 140 includes a movable end 141 and a lifting end 142, and the movable end 141 is slidably connected to the host 110 and may freely rotate with respect to the host 110. The keyboard 130 contacts the movable end 141, so that the user may push the auxiliary display 140 by pushing the keyboard 130, so as to allow the keyboard 130 and the auxiliary display 140 to synchronously slide relative to the host 110 in the sliding direction D.

In the first state shown in FIG. 1, the main display 120 is opened up relative to the host 110, and the keyboard 130 and the auxiliary display 140 are kept in initial positions. That is, the keyboard 130 and the auxiliary display 140 do not yet slide relative to the host 110, and the auxiliary display 140 is not yet lifted.

In the second state shown in FIG. 2, the main display 120 is opened up relative to the host 110, and the keyboard 130 slides towards the main display 120 and pushes the auxiliary display 140, so that the auxiliary display 140 slides and is lifted up relative to the host 110. At this time, the lifting end 142 of the auxiliary display 140 is lifted to a maximum height and contacts the main display 120. Besides, the auxiliary display 140 has a tilt angle with respect to the host 110, so that the user may enjoy a comfortable viewing experience and is provided with operational convenience.

In the third state shown in FIG. 3, the keyboard 130 continues to slide towards the main display 120 and pushes the auxiliary display 140. In this way, the auxiliary display 140 slides relative to the host 110 and pushes the main display 120 to rotate with respect to the host 110, so that the opening angle of the main display 120 relative to the host 110 may be further expanded. At the same time, the lifting end 142 is slightly lowered from the maximum height to be positioned at an lower edge of a display region of the main display 120, such that continuity between the home screen displayed by the main display 120 and the auxiliary screen displayed by the auxiliary display 140 is enhanced.

In this embodiment, the lifting end 142 is provided with a first magnet 142a, and the main display 120 is provided with a second magnet 121 corresponding to the first magnet 142a. When the lifting end 142 contacts the main display 120, magnetic attraction is generated between the first magnet 142a and the second magnet 121. Therefore, the user may also drive the auxiliary display 140 to slide on the host 110 by flipping the main display 120 and may adjust the angle and height of the auxiliary display 140.

Since the angle and height of the auxiliary display 140 may be adjusted by the user according to the user's personal needs, and such adjustment mechanism is easy and intuitive, the electronic apparatus 100 exhibits favorable operational convenience and flexibility.

Note that when the lifting end 142 contacts and is magnetically attracted to the main display 120, if the user flips the main display 120 to reduce the opening angle of the main display 120 relative to the host 110 or to set the main display 120 to return to the closed state, the auxiliary display 140 is pushed by the main display 120 to slide relative to the main display 110 and sink. At the same time, the keyboard 130 is pushed by the auxiliary display 140 and slides relative to the host 110.

With reference to FIG. 1 to FIG. 3, in this embodiment, the supporting mechanism 150 may be a link group and is configured to assist the auxiliary display 140 in completing the lifting movement. In addition, the supporting mechanism 150 may also be configured to securely support the lifted auxiliary display 140, such that the lifted auxiliary display 140 is prevented from swinging or sinking, and enhanced operational reliability is thereby provided.

To be specific, the supporting mechanism 150 includes a first link 151, a second link 152, and a third link 153. The first link 151 is connected to the second link 152, and the second link 152 is connected to the third link 153. To be more specific, the first link 151 is slidably connected to the host 110, and the first link 151 is configured to slide in the sliding direction D and may freely rotate with respect to the host 110. The first link 151 is pivotally connected to the second link 152, and the second link 152 is pivotally connected to the host 110 and is pivotally connected to the third link 153. In addition, the third link 153 is pivotally connected to the lifting end 142.

In this embodiment, the first link 151, the second link 152, and the third link 153 correspond to a bottom portion of the auxiliary display 140. Moreover, the host 110 has an installation space configured to accommodate the first link 151, the second link 152, and the third link 153. The first link 151 includes a first end 151a and a second end 151b opposite to each other. The first end 151a corresponds to the movable end 141 and is close to the keyboard 130. The first end 151a is slidably connected to and pivotally connected to the host 110, and the second end 151b is pivotally connected to the second link 152.

The second link 152 includes a third end 152a and a fourth end 152b opposite to each other, and the third end 152a is pivotally connected to the host 110. A pivot point P1 of the third end 152a and the host 110 is coaxial with a pivot point P2 of the main display 120 and the host 110. Besides, a pivot point P3 of the second end 15l b and the second link 152 is located between the third end 152a and the fourth end 152b, and the fourth end 152b is pivotally connected to the third link 153. In this embodiment, a pivot point P4 of the third link 153 and the fourth end 152b, the pivot point P3 of the second end 151b and the second link 152, and the pivot point P1 of the third end 152a and the host 110 fall on the same line.

For instance, each of the pivot point P1 of the third end 152a and the host 110, the pivot point P2 of the main display 120 and the host 110, the pivot point P3 of the second end 151b and the second link 152, and the pivot point P4 of the third link 153 and the fourth end 152b is integrated with a torque positioning design. In this way, a relative position between the second link 152 and the host 110, a relative position between the main display 120 and the host 110, a relative position between the first link 151 and the second link 152, and a relative position between the second link 152 and the third link 153 are positioned, such that any two members which are pivotally connected to each other are prevented from being slidably detached.

With reference to FIG. 1 and FIG. 2, the main display 120 is opened up relative to the host 110, the keyboard 130 slides towards the main display 120 in the sliding direction D, and the keyboard 130 pushes the auxiliary display 140, so that the auxiliary display 140 slides towards the main display 120 in the sliding direction D. In this process, the lifting end 142 of the auxiliary display 140 pushes the third link 153, and the third link 153 pushes the fourth end 152b of the second link 152, such that the second link 152 rotates with respect to the host 110.

To be specific, the fourth end 152b of the second link 152 is turned towards the main display 120 and drives the third link 153 to move towards the main display 120 to lift up the lifting end 142 of the auxiliary display 140. In addition, the second link 152 pulls the second end 151b of the first link 151, so that the first end 151a of the first link 151 slides relative to the host 110 in the sliding direction D.

In this embodiment, the host 110 has a first sliding recess 111 and a second sliding recess 112 arranged side by side with the first sliding recess 111. The first sliding recess 111 and the second sliding recess 112 fall on the same line, and extending directions of the first sliding recess 111 and the second sliding recess 112 are parallel to the sliding direction D. To be specific, the keyboard 130 has a sliding shaft 131 away from the first end 151a of the first link 151. The sliding shaft 131 is disposed in the first sliding recess 111, and the first end 151a of the first link 151 is slidably disposed in the second sliding recess 112, such that the keyboard 130 and the first link 151 are ensured to slide stably relative to the host 110.

For instance, the auxiliary display 140 is mechanically coupled to the keyboard 130, and the auxiliary display 140 may freely move relative to the keyboard 130. Accordingly, the auxiliary display 140 and the keyboard 130 may synchronously move, and the auxiliary display 140 and the keyboard 130 are prevented from being detached. From another perspective, a surface 113 in the host 110 configured to carry the keyboard 130 is provided with a third sliding recess 114. An extending direction of the third sliding recess 114 is parallel to the sliding direction D, and a portion of the keyboard 130 is disposed in the third sliding recess 114, such that the keyboard 130 is ensured to slide stably relative to the host 110.

In the state shown in FIG. 2, the lifting end 142 of the auxiliary display 140 is lifted to the maximum height and contacts the main display 120. In addition, the pivot point P1 of the third end 152a and the host 110, the pivot point P2 of the main display 120 and the host 110, the pivot point P3 of the second end 151b and the second link 152, the pivot point P4 of the third link 153 and the fourth end 152b, and a pivot point P5 of the third link 153 and the lifting end 142 fall on the same line, such that the auxiliary display 140 is stably supported accordingly.

With reference to FIG. 2 and FIG. 3, the keyboard 130 continues to slide towards the main display 120 in the sliding direction D and pushes the auxiliary display 140. In this way, the auxiliary display 140 slides relative to the host 110 in the sliding direction D and pushes the main display 120 to rotate with respect to the host 110, so that the opening angle of the main display 120 relative to the host 110 may be further expanded. In this process, the lifting end 142 of the auxiliary display 140 pushes the third link 153, and the third link 153 pushes the fourth end 152b of the second link 152, such that the second link 152 rotates with respect to the host 110, and rotation may be performed to a great extent.

At this time, the pivot point P1 of the third end 152a and the host 110, the pivot point P2 of the main display 120 and the host 110, the pivot point P3 of the second end 151b and the second link 152, the pivot point P4 of the third link 153 and the fourth end 152b, and the pivot point P5 of the third link 153 and the lifting end 142 still fall on the same line, the third link 153 synchronously rotates with respect to the host 110 with the second link 152, and the lifting end 142 is slightly lowered from the maximum height.

With reference to FIG. 1 to FIG. 3, the electronic apparatus 100 further includes a stylus pen 160 and a loudspeaker 170 disposed on the host 110, and the stylus pen 160 and the loudspeaker 170 are away from the movable end 141 of the auxiliary display 140. In the first state shown in FIG. 1, the stylus pen 160 and the loudspeaker 170 are covered by the keyboard 130. In the second state shown in FIG. 2 and the third state shown in FIG. 3, the keyboard 130 slides towards the main display 120, so that the stylus pen 160 and the loudspeaker 170 are exposed outside of the keyboard 130.

For instance, the user may take out the stylus pen 160 from a recess on the host 110 to operate on the main display 120 and the auxiliary display 140 or a touch tablet. In addition, the loudspeaker 170 may be configured to enhance sound effect performance of the electronic apparatus 100.

In view of the foregoing, in the electronic apparatus integrated with the auxiliary display provided by the disclosure, since the angle and height of the auxiliary display may be adjusted, the user may conveniently operate on the auxiliary display and may enjoy a comfortable viewing experience when using the auxiliary display. In addition, the user may push the auxiliary display by pushing the keyboard and drives the auxiliary display to slide and be lifted up relative to the host. That is, the angle and height of the auxiliary display may be adjusted by the user according to personal needs, such that the electronic apparatus provided by the disclosure exhibits good operational flexibility. When the auxiliary display is being lifted relative to the host, the supporting mechanism synchronously moves, and the auxiliary display is supported by the supporting mechanism. That is, the lifted auxiliary display is securely supported by the supporting mechanism and may not easily swing or sink. The electronic apparatus provided by the disclosure therefore exhibits good operational reliability.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic apparatus, comprising:
a host;
a main display, pivotally connected to the host;
a keyboard, slidably disposed on the host;
an auxiliary display, disposed on the host, arranged side by side with the keyboard, the auxiliary display comprising a movable end and a lifting end, wherein the keyboard contacts the movable end, and the movable end is slidably connected to the host; and
a supporting mechanism, comprising a first link, a second link, and a third link, wherein the first link is slidably connected to the host and is pivotally connected to the second link, the second link is pivotally connected to the host and is pivotally connected to the third link, and the third link is pivotally connected to the lifting end, wherein the first link comprises a first end and a second end opposite to each other, the first end is slidably connected to and pivotally connected to the host, the second end is pivotally connected to the second link, wherein the host has a first sliding recess and a second sliding recess arranged side by side with the first sliding recess, and the first sliding recess and the second sliding recess fall on a same line, the keyboard has a sliding shaft away from the first end of the first link, the sliding shaft is disposed in the first sliding recess, and the first end of the first link is slidably disposed in the second sliding recess.

2. The electronic apparatus according to claim 1, wherein the second link comprises a third end and a fourth end opposite to each other, wherein the third end is pivotally connected to the host, the fourth end is pivotally connected to the third link, and the second end is located between the third end and the fourth end.

3. The electronic apparatus according to claim 2, wherein a pivot point of the third end of the second link and the host is coaxial with a pivot point of the main display and the host.

4. The electronic apparatus according to claim 2, wherein the main display is opened up relative to the host, the keyboard slides towards the main display and pushes the auxiliary display, so that the auxiliary display moves relative to the host, the lifting end of the auxiliary display pushes the third link and the third link pushes the fourth end of the second link at a same time, so that the second link rotates with respect to the host, and the second link pulls the second end of the first link, so that the first end of the first link slides relative to the host.

5. The electronic apparatus according to claim 4, wherein a pivot point of the third link and the lifting end, a pivot point of the third link and the fourth end of the second link, a pivot point of the second link and the second end of the first link, and a pivot point of the third end of the second link and the host fall on a same line.

6. The electronic apparatus according to claim 5, wherein the lifting end contacts the main display, the lifting end is provided with a first magnet, the main display is provided with a second magnet corresponding to the first magnet, and the first magnet is magnetically attracted to the second magnet.

7. The electronic apparatus according to claim 2, wherein a pivot point of the third link and the fourth end of the second link, a pivot point of the second link and the second end of the first link, and a pivot point of the third end of the second link and the host fall on a same line.

8. The electronic apparatus according to claim 1, further comprising a stylus pen and a loudspeaker disposed on the host, wherein the stylus pen and the loudspeaker are away from the movable end of the auxiliary display, and the stylus pen and the loudspeaker are covered by the keyboard, or the stylus pen and the loudspeaker are exposed outside of the keyboard.

* * * * *